US006209007B1

(12) United States Patent
Kelley et al.

(10) Patent No.: US 6,209,007 B1
(45) Date of Patent: Mar. 27, 2001

(54) WEB INTERNET SCREEN CUSTOMIZING SYSTEM

(75) Inventors: Edward E. Kelley, Wappingers Falls; Christopher E. Cartier, Stony Point; Norman J. Dauerer; John U. Knickerbocker, both of Hopewell Junction, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/978,917

(22) Filed: Nov. 26, 1997

(51) Int. Cl.[7] .................................................. G06F 17/30
(52) U.S. Cl. ............................................ 707/513; 707/102
(58) Field of Search ...................................... 707/513, 530, 707/511, 514, 501, 10, 3, 5, 102, 104

(56) References Cited

U.S. PATENT DOCUMENTS

| | | | |
|---|---|---|---|
| 4,763,356 | | 8/1988 | Day, Jr. et al. ...................... 379/368 |
| 5,530,759 | | 6/1996 | Braudaway et al. ................... 380/54 |
| 5,623,652 | * | 4/1997 | Vora et al. .............................. 707/10 |
| 5,647,056 | | 7/1997 | Barrett et al. ........................ 709/220 |
| 5,761,662 | * | 6/1998 | Dasan ..................................... 707/10 |
| 5,802,518 | * | 9/1998 | Karaev et al. ............................ 707/9 |
| 5,813,007 | * | 9/1998 | Nielsen ................................. 707/10 |
| 5,819,302 | * | 10/1998 | Nielsen ................................ 707/532 |
| 5,848,427 | * | 12/1998 | Hyodo .................................. 707/513 |
| 5,890,171 | * | 3/1999 | Blumer et al. ........................ 707/501 |
| 5,911,145 | * | 6/1999 | Arora et al. .......................... 707/514 |
| 5,926,808 | * | 7/1999 | Evans et al. ............................. 707/3 |
| 5,940,834 | * | 8/1999 | Pinard et al. ......................... 707/102 |
| 5,944,791 | * | 8/1999 | Scherpbier .......................... 709/218 |
| 5,945,989 | * | 8/1999 | Freishtat et al. ..................... 345/329 |

OTHER PUBLICATIONS

Sigiura et al., Internet Scrapbook: creating personalized world-wide web pages, Human factors in computing systems, CHI 97, pp. 343–344, Mar. 27, 1997.*
Canon Internet Web Page, www.ccsi.canon.com/webrecord/, Apr. 24, 1997.
IBM Technical Disclosure Bulletin, "Temporary Global Passwords", vol. 36, No. 03, Mar. 1993; pp. 451–453.
IBM Technical Disclosure Bulletin, "Resource Access Control Facility Password Propagation for Multiple Virtual Storage", vol. 36, No. 06B, Jun. 1993.
IBM Technical Disclosure Bulletin, "Network Signon Coordination Configuration", vol. 36, No. 12, Dec. 1993.

* cited by examiner

Primary Examiner—Hosain T. Alam
Assistant Examiner—Sanjiv Shah
(74) Attorney, Agent, or Firm—DeLio & Peterson, LLC; Peter W. Peterson; Aziz M. Ahsan (57) ABSTRACT

A process for creating a customized web page containing information from other web pages accessible by a client computer from an inter- or intra-net. First, there is provided the parameters for a search of desired information from web pages on a network. A search is initiated from a client computer and the desired information on the network is retrieved. The client computer then views the desired information retrieved from the search on the network, and at least one original web page on the network from which the desired information was retrieved in the search. The search may be optionally modified, and the above steps repeated. The customized web page is then created, for example, on a program storage device accessible by the client computer, and contains: 1) the desired information retrieved in the search and 2) other structure, not retrieved in the search, of at least one original web page. The process may further include updating the information retrieved in the search on the customized web page when a change in the retrieved information is made in the original web page.

18 Claims, 10 Drawing Sheets

WEB INTERNET SCREEN CUSTOMIZING SYSTEM

BACKGROUND OF THE INVENTION

1. Field of the Invention

The present invention relates to computer programs and in particular to software for creating a customized web page containing information from other web pages accessible by a client computer from an inter- or intra-net.

2. Description of Related Art

Web pages are typically made up of HyperText Markup Language (HTML) tags displaying HTML source files containing the headings, data, text, footings and hyperlinks to other web pages. In many instances, the user at a client computer desires to see only a small portion of the total web page, Many web pages span several screens which require the user to move up and down in order to view all of the desired information. This becomes tedious and counterproductive when the web page on which the desired information is consulted often. The prior art provides no method of providing individual customization to include only the subset of data that a particular user finds of interest and still retain the basic structure of the web page from the original document.

Existing web search engines usually search data from many sources and not a single web document. Since they search for data from many sources, there is no single web page with a basic structure to preserve. Search engines such as Yahoo and Alta Vista, available on the Internet and intra-net applications currently are not useful for customizing a particular web page by retaining the basic structure of the web page and presenting a subset of the data in the page. All that such search engines do is to present rows of lines that have the requested search items.

Moreover, such web pages containing desired information may change on a periodic basis, so that any information copied from such pages quickly becomes outdated. The prior art does not provide the ability of a user to easily build a customized web page from a series of unrelated web pages and to have the customized web page updated with changes as changes take place in the series of original web pages. There is a further need to have the changes to the web pages addresses (URLs) automatically be included in the customized web page if the changes occur anywhere in the series of web pages to data used in a customized web page.

Bearing in mind the problems and deficiencies of the prior art, it is therefore an object of the present invention to provide a process and system for creating a customized web page from other web pages accessible by a client computer from an inter- or intra-net.

It is another object of the present invention to provide to a user only a subset of data from a web page that a user desires, while still retaining the original structure of the web page from the original document.

Yet another object of the present invention is to provide a customized web page from one or more other web pages of documents which retains a header, footer and optionally other original structure from at least one of the web pages from the original documents.

A further object of the invention is to easily build a customized web page from a series of unrelated web pages, and to have the customized web page updated with changes as the changes take place in the original unrelated web pages.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for creating a customized web page containing information from other web pages accessible by a client computer from an inter- or intra-net. First, there is provided the parameters for a search of desired information from web pages on a network. A search is initiated from a client computer and the desired information on the network is retrieved. The client computer then views the desired information retrieved from the search on the network, and at least one original web page on the network from which the desired information was retrieved in the search. The search may be optionally modified, and the above steps repeated. The customized web page is then created, for example, on a program storage device accessible by the client computer, and contains: 1) the desired information retrieved in the search and 2) other structure, not retrieved in the search, of at least one original web page. The process may further include updating the information retrieved in the search on the customized web page when a change in the retrieved information is made in the original web page.

The desired information retrieved from the search may include lists, tables and text, and the desired information retrieved from the search may be in the form of source code such as HTML, Java and javascript.

Normally, the original web page on the network from which the desired information was retrieved in the search is accessed through a network server. The process also may include providing in a program storage device of the network server a database listing of the original web pages containing information retrieved in the search and, for each such original web page in the database listing, a corresponding listing of customized web pages containing the information retrieved in the search from the original web page. The network server then determines if a change has been made to the information retrieved in the search in an original web page; and updates the information on the customized web page when a change in the retrieved information is made in the original web page.

Before the network server updates the information, the client computer may send a notification to the network server that the customized web page should be updated when a change in the retrieved information is made in the original web page.

The other structure not retrieved in the search but included in the customized web page may include headings, footings, imbedded javascript code, text other than the desired information, and any links to other web pages therein.

The desired information may be retrieved from a plurality of original web pages, in which case the customized web page includes 1) the desired information retrieved in the search from the plurality of original web pages and 2) other structure, not retrieved in the search, of one of the original web pages.

In another aspect, the present invention provides a system for creating a customized web page containing information from other web pages accessible by a client computer from an inter- or intra-net. The system includes means for initiating a search from a client computer of desired information from web pages on a network and retrieving the desired information from the search, as well as means for viewing on the client computer the desired information retrieved from the search on the network and at least one original web page on the network from which the desired information was retrieved in the search. The system also includes means for creating on a program storage device accessible to the client computer a customized web page containing: 1) the desired information retrieved in the search and 2) other structure, not retrieved in the search, of at least one original web page. The other structure may include headings, footings, imbedded javascript code, text other than the desired information, and any links to other web pages therein.

There may also be included on the system means for updating the information retrieved in the search on the customized web page when a change in the retrieved information is made in the original web page.

Since the original web page on the network from which the desired information was retrieved in the search is normally accessed through a network server, the system may further include a program storage device accessible by the network server. The program storage device has a database listing of the original web pages containing information retrieved in the search and, for each such original web page in the database listing, a corresponding listing of client computer customized web pages containing the information retrieved in the search from the original web page. The system also includes means for determining at the network server if a change has been made to the information retrieved in the search in an original web page and means for updating the information retrieved in the search on the customized web page when a change in the retrieved information is made in the original web page.

There may also be incorporated in the system means for sending a notification from the client computer to the network server that the client computer customized web page should be updated when a change in the retrieved information is made in the original web page.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–10 of the drawings in which like numerals refer to like features of the invention. Features of the invention are not necessarily shown to scale in the drawings.

The present invention provides the ability to create a customized web page based on a Boolean search for the information of interest found on another, original web page while preserving the basic structure of the original web page. The invention also contains the logic to select a subset of data from the HTML source file which includes HTML source code, the Java code referenced by the HTML source file, the javascript code found in the HTML source file and any other code that is available to reference data on a web browser. The invention also permits interactive customization that is invoked whenever the customized web page is accessed to update it with retrieved information that is changed in the original web page.

The present invention also provides the ability to have a customized web page built from a series of other original web pages. The user at the client computer may initiate a different Boolean search for a series of web pages. The invention includes the ability to perform a different search for each source web page and the ability to build the customized web page from the results of each of these searches. The basic web structure can be taken from any of the original web pages that are used to make the customized web page. The invention also has the ability to include automatically any changes to the original web pages (URLs) that are used in the customized web page or to simply give notice that the URLs have changed and allow the user to personally make the changes.

Figure 1:
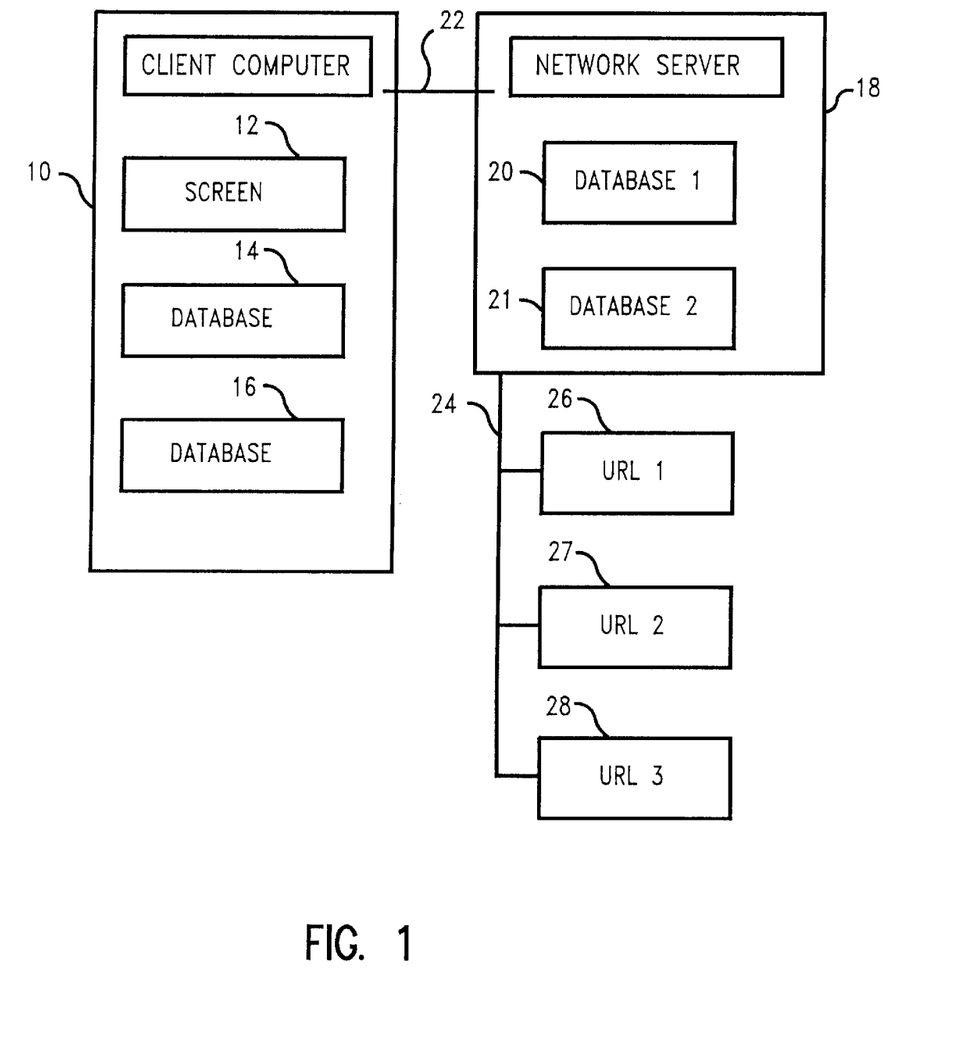
FIG. 1 is a schematic of the system of the present invention for creating a customized web page containing information from other web pages accessible by a client computer from an inter- or intra-net.

A typical client/network system is illustrated in FIG. 1. Client computer 10 is linked by telephone or other network cable 22 to a network server computer 18 which contains a plurality of databases 20 and 21. Such server or database may be on the Internet or on an intranet system. Client computer 10 has a microprocessor for executing stored programs and has access to first and second databases 14, 16, respectively, on its program storage device for storage of addresses of HTML web pages and other files which may be downloaded from a network service provider. Database 14 is conventionally referred to a bookmark database, having addresses of often-used web pages or files. Web pages or files 26, 27, 28 having different addresses (URLs) are accessible by link 24 through network server 18. As will be explained further, database 16 contains one or more customized web pages created using information retrieved from such other web pages, for example URL 1 (26), URL 2 (27) or URL 3 (28). Preferably, both databases 14, 16 are physically present in the client computers, but they may be located elsewhere, so long as the client computer has access to the information therein. A screen 12 on client computer 10 is able to display the created customized web pages containing information accessed from other web pages on the network.

Network server database 20 may contain customized web pages accessible by client computer 10 which are not physically present at the client computer. The network server may also include a database 21 having a list of the original web pages (e.g., URL 1, 2 and/or 3) containing information contained in the client computer customized web page(s). For each such original web page in the network database listing, there is also contained in the database a corresponding listing of customized web pages containing said information from the original web page(s).

The computer program or software incorporating the process steps and instructions described further below may be stored in both the client computer(s) and network server on an otherwise conventional program storage device, such as a semiconductor chip, a read-only memory, or magnetic media such as a diskette or computer hard drive, which is readable and executable by a computer in conjunction with a web browser such as Netscape Navigator.

The basic structure of the web page consists of the title, headings, footings, graphics, imbedded javascript code, general text and any links found in the headings, footings, graphics, imbedded javascript code and general text. The basic structure of the web page also consists of the headings, footings, graphics, general text that are produced by Java code or other language code, and any links found in the headings, footings, graphics and general text. It does not consist of the primary information the web page was created to present.

Figure 2:
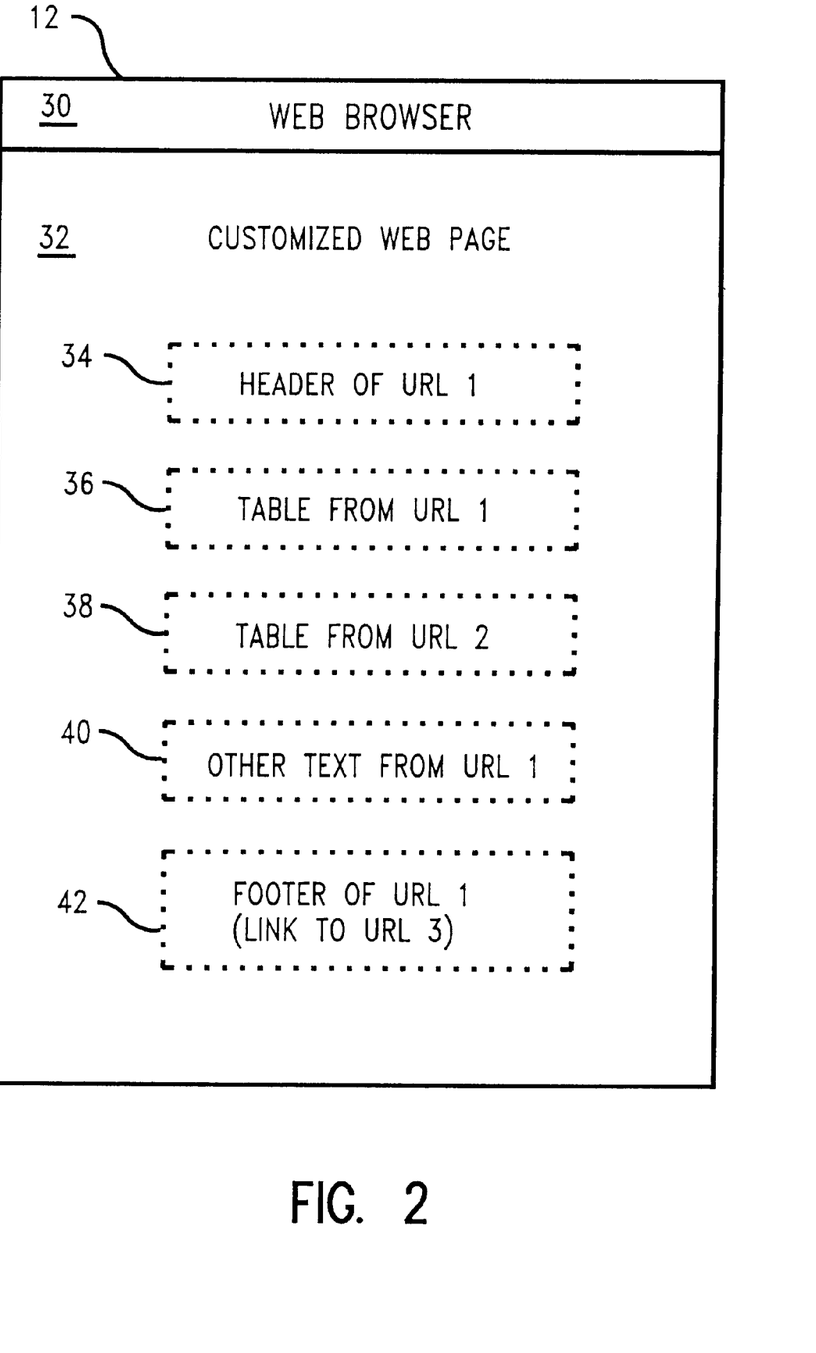
FIG. 2 is a view of a customized web page containing information retrieved from searches of other web pages created on a web browser of the client computer of FIG. 1.

An example of a customized web page created from information retrieved in a search of other web pages is shown in FIG. 2. Screen 12 displays web browser 30 (running on client computer 10) on which is created customized web page 32. Customized web page 32 contains desired information retrieved from a search in the form of a table 36 from an original web page with address URL 1, and another table 38 from a different original web page with address URL 2. Other retrieved information included on the page may include lists and text, which may be in the form of HTML, Java and javascript or other source code. In order to present the tables 36, 38, the customized web page maintains further relevant information not retrieved from the search, in the form of explanatory header 34, other text 40, and footer 42, all from URL 1. In the case of footer 42, the footer from URL 1 contained an HTML hyperlink to URL 3, which is preserved in customized web page 32. Other structure which may be selected includes imbedded javascript and other code.

Definitions relevant to the present invention are as follows:

URL—Uniform Resource Locator. The address of a particular web page on an inter- or intra-net.

HTML—Hypertext Markup Language.

HTML tag—HTML markup tags.

HTML source code—Code with the HTML tags to be converted by a web browser to be displayed on a monitor.

HTML source file—File that contains the HTML source code.

HTML file—File that has been formatted by the web browser and will be displayed on a monitor.

Web page—A file that includes source code, javascript code, graphics, or references to Java code ;or other language code, that is formatted by a web browser and presented to an output screen.

Basic web page—The basic structure of the web page consists of the Title, headings, footings, graphics, imbedded javascript code, general text and any links found in the headings, footings, graphics, general text that are produced by java code or other language code and any links found in the headings, footings, graphics and general text. It does not consist of the primary information the web page was created to present.

Web page subset—The web page subset is a selected list of items, from the primary information the web page was created to present, from a Boolean search of the web page plus the basic web page. The web page subset comes form the HTML source file, which contains HTML source code, java code referenced by the HTML source document, javascript code found in the HTML source file and any other code that is available to reference data on a web browser.

Lists—The output of HTML source code or any other code that produces lists of data after it has been formatted.

Tables—The output of HTML source code or any other code that produces tables of data after it has been formatted.

Text—The output of HTML source code or any other code that produces text after it has been formatted.

Javascript—A language that can be placed in an HTML file land is processed by the browser to build an output screen.

Java—A language that can be referenced in an HTML file, transmitted to a client, and processed by a browser to build an output screen.

Other language—Any other language or languages that contains code that is processed and produces the output viewed by the typical web browser.

Customized multiple web pages—A customized web page built from multiple unrelated web pages.

Local storage—Read/write storage on a program storage device to which the client computer has access.

Server customized table—Table used by the network server that supplies the information pointed to by URLs on the web page, to keep track of the customized web pages, items and addresses of the clients.

Bookmark files—These files contain addresses of URLs selected and frequently accessed by the client computer and are found on web browsers that are on the client computers.

Flow charts of the process used in the present invention are shown in FIGS. 3–10. Numerals in circles indicate connections to and from other parts of the flow chart.

Figure 3:
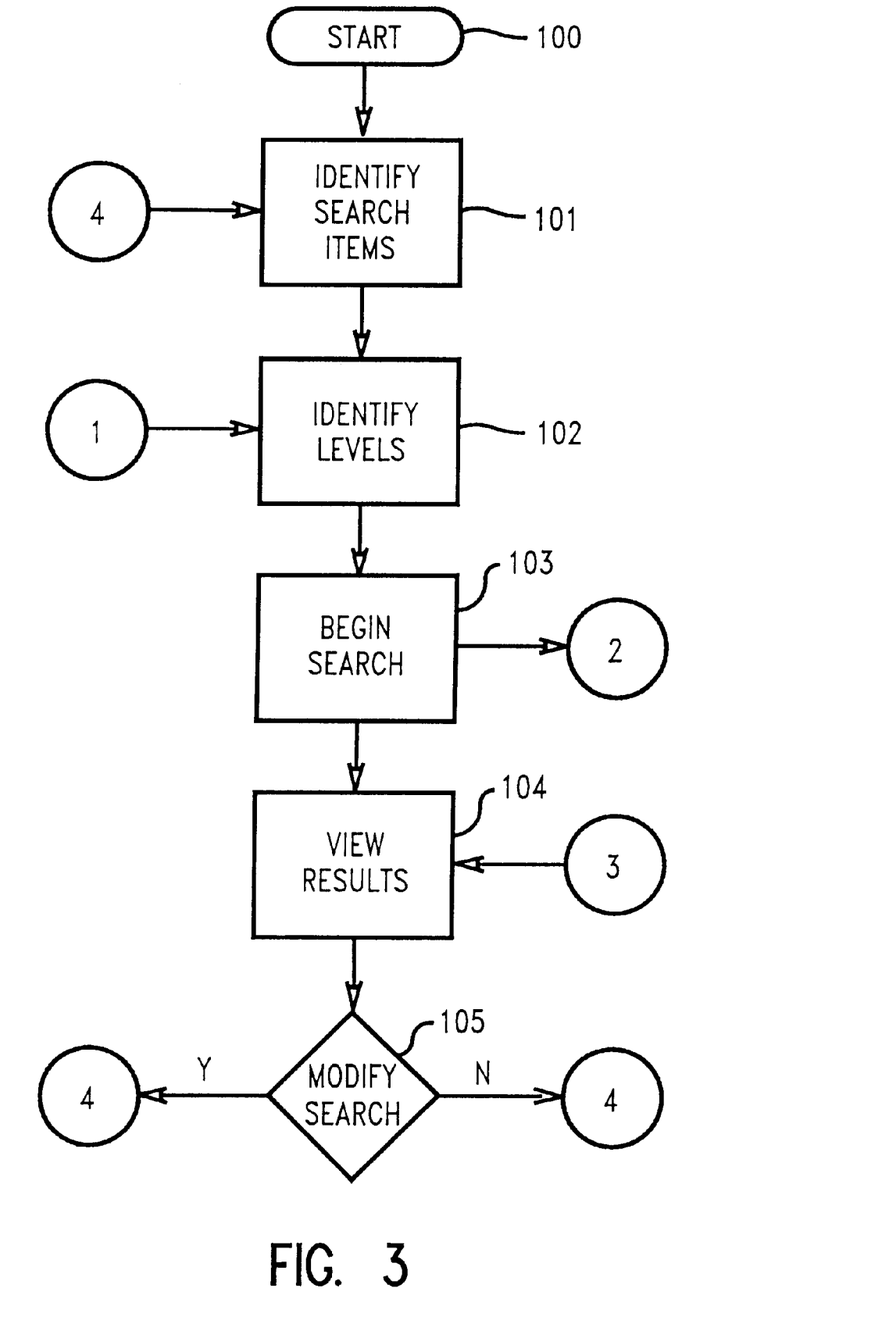
FIGS. 3–10 are block diagram flow charts of the preferred steps employed in practicing the present invention, wherein circled numerals indicate links between the steps.

FIGS. 3–8 describe the construction of a customized web page from one source with multiple levels, and the flow chart description is as follows:

100—Start the process.

101—Identify search items. Present an input form to the user where can identify the items to be searched that will appear on the new web page subset. The user is able to specify a complete Boolean search that will search all lines in the HTML source file and return those lines in a temporary file for examination by the user. It will also search for the existence of Java code, javascript code and any other language code. The user may also examine the results of the search and modify the search in one of three ways: 1) Redo the basic search by changing one or more basic parameters; 2) Add to the existing lines by having the Boolean search add to the results of the previous search; 3) Decrease what has been found by having the Boolean search substrate from the results of the previous search.

102—Identify the levels. Identify the levels in the hierarchy that are to be searched to build the web page subset. When a web page presents another web page when an item is selected from the first web page, this represents one level in the web page hierarchy.

103 Begin the search. Search the HTML source code for lines of data that would satisfy the search items previously identified, search for the search items in javascript code; or search for the existence of Java code or other language code.

104—Identify source HTML tags. Identify the HTML tags in the HTML source files that reference the data found by the Boolean search. By reading the lines from the HTML source files the invention determines the HTML tags that are used to display the web page data.

105—Modify search? Check results of search and decide if search is to be modified.

Figure 4:
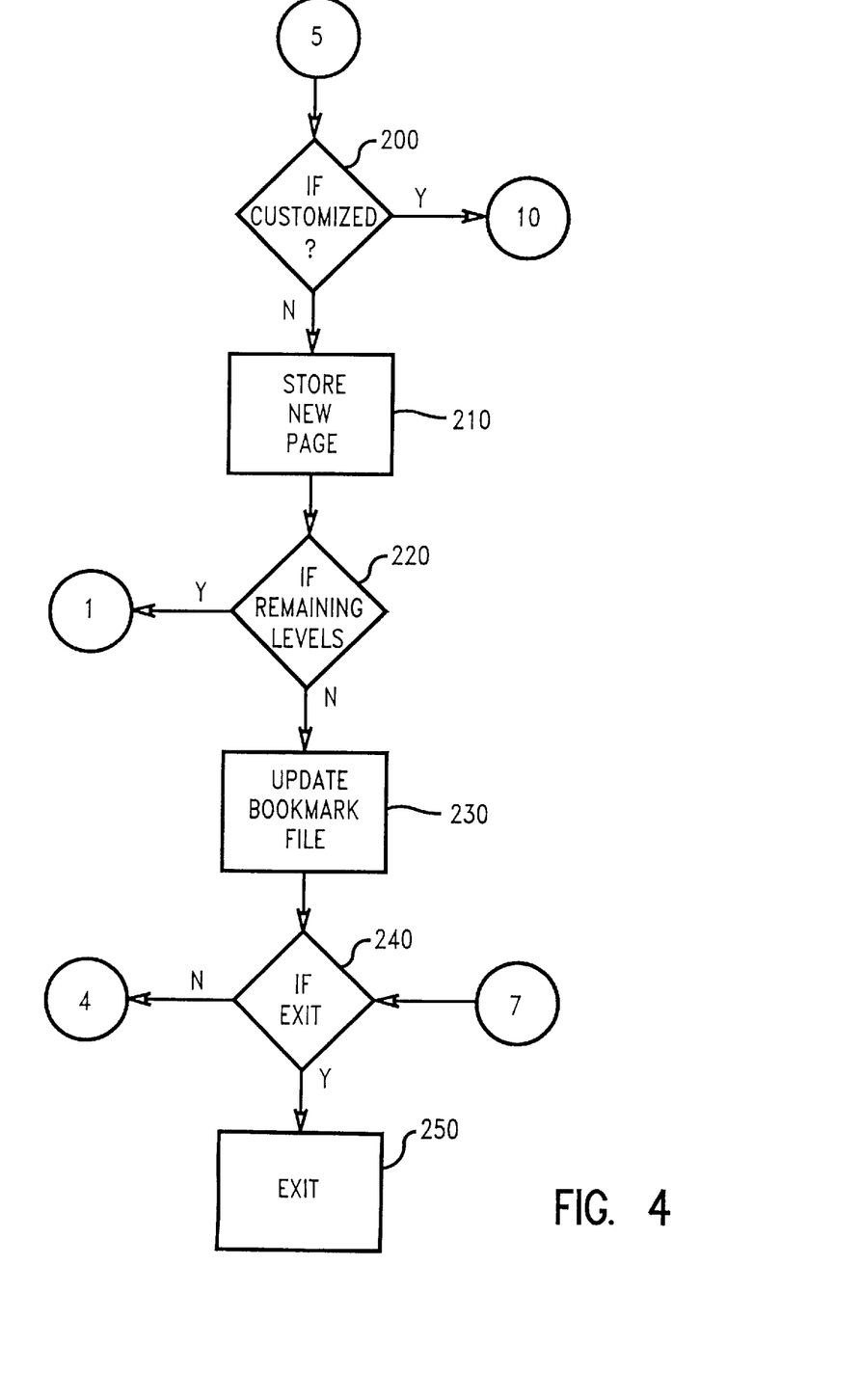

200—If customized? Check if we are customizing multiple web pages.

210—Store the new web page. Store the new web page in personal storage. This new web page is named by the user. Since the user is prompted for the name and since the system can be run "n" number of times on the same web page with different search items there can be any number of web pages created based on a web page. This in effect becomes a way to develop multiple configurations of a web page or a web page hierarchy.

220—If remaining levels? Check if there are remaining levels of the hierarchy that have not been searched.

230—Update bookmark file. Update the web browser bookmark file with the new web page.

240—If exit? Check if time to exit.

250—Exit. Exit the program.

Figure 5:
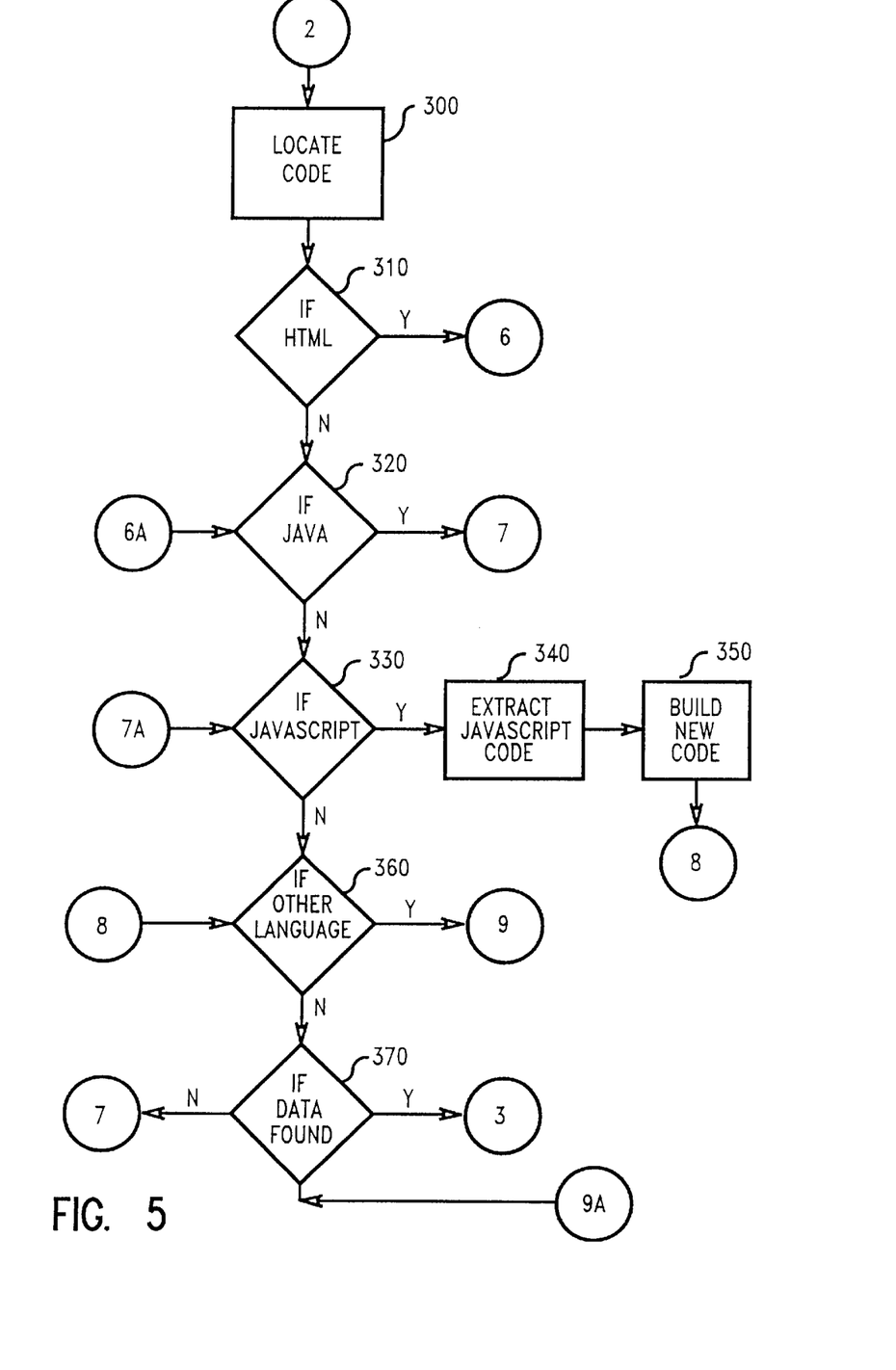

300—Locate code. Locate the lines of code in the HTML source code that were selected as search items.

310—If HMTL? Check if the source code is a HTML source code file.

320—If java? Check if a reference to Java code has been found.

330—If javascript? Check if any search items have been found in javascript code.

340—Extract javascript code. Extract the subset of javascript code that will generate the search items or reference to the search items.

350—Build new code. Take the extracted javascript code and build new code that will generate the search items or references to the search items.

360—If other language? Check if a reference to other languages have been found that are used to build the web page.

370—If data found? Check if any HTML source code, java code, javascript, or any other language code has been found that satisfy the search items.

Figure 6:
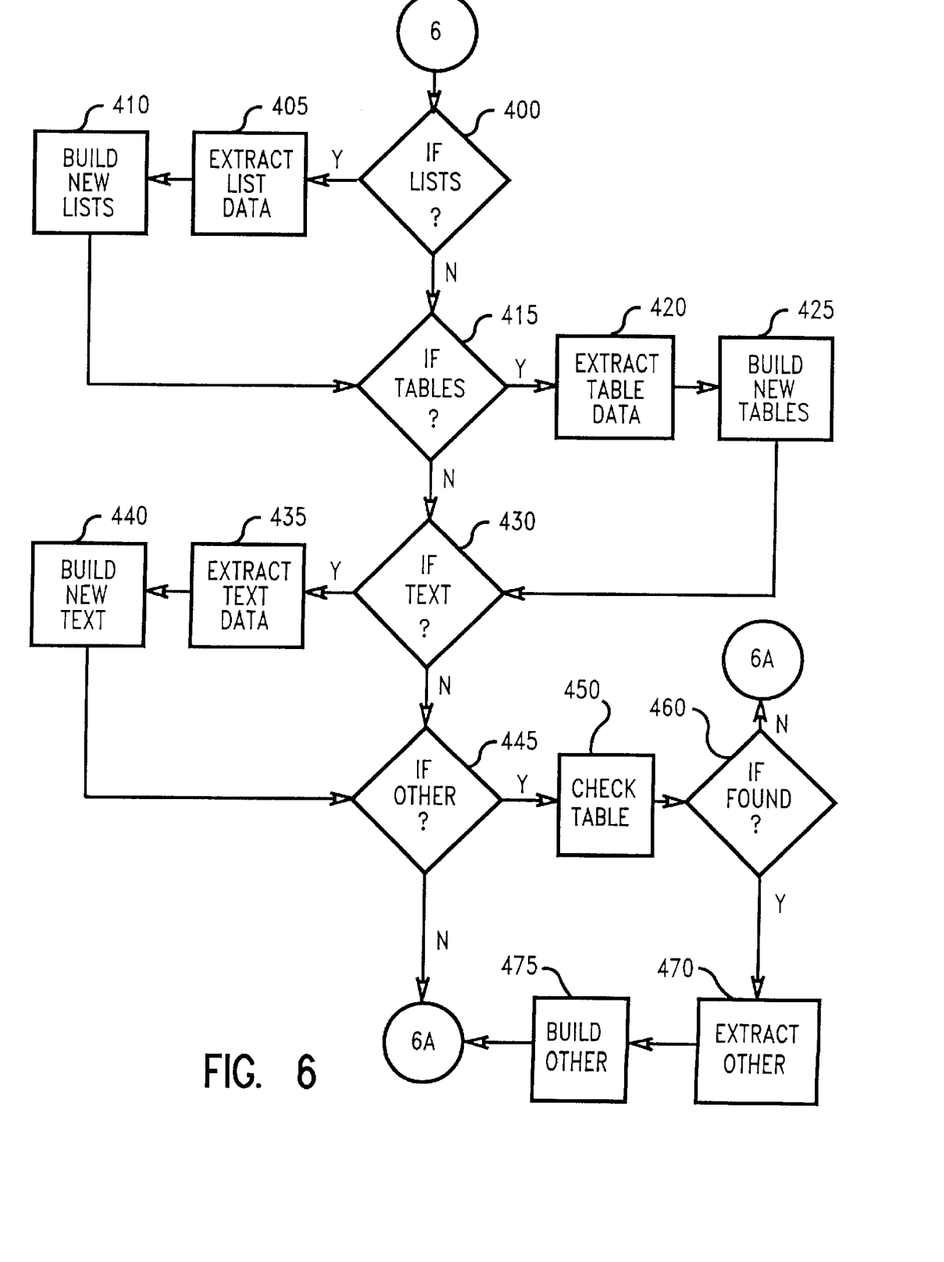

FIG. 6 describes the steps taken if the located code is a HTML source code file, and the flow chart description is as follows:

400—If lists? Check if the search items were found in lists in the HTML source code.

405—Extract list data. Extract the HTML source code that is used to build the lists that satisfy the search items.

410—Build new lists. Build new HTML source code that will display the lists that satisfy the search items for the web page subset.

415—If tables? Check if the search items were found in tables in the HTML source code.

420—Extract table data. Extract the HTML source code that is used to build the tables that satisfy the search items.

425—Build new tables. Build new HTML source code that will display the tables that satisfy the search items for the web page subset.

430—If text? Check if the search items were found in text in the HTML source code.

435—Extract the text data. Extract the HTML source code that is used to build the text that satisfy the search items.

440—Build new text. Build new HTML source code that will display the text that satisfy the search items for the web page subset.

445—If other? Check if other type of HTML source code is used to satisfy the search items. This includes graphic files.

450—Check table. Check a list of other types of HTML source code to see if other HTML source code found to satisfy the search items is described in a library that contains instructions for building a subset of the code for the new web page. Graphic files will be handled by reading the text either next to the graphic files or reading any text that is displayed by the graphic files.

460—If found? Check if graphic files or other HTML source code is used to satisfy the search items.

470—Extract other. Extract the graphic file references and or other HTML source code that satisfies the search items.

475—Build other. Build new HTML source code including graphic files that will satisfy the search items for the web page subset.

Figure 7:
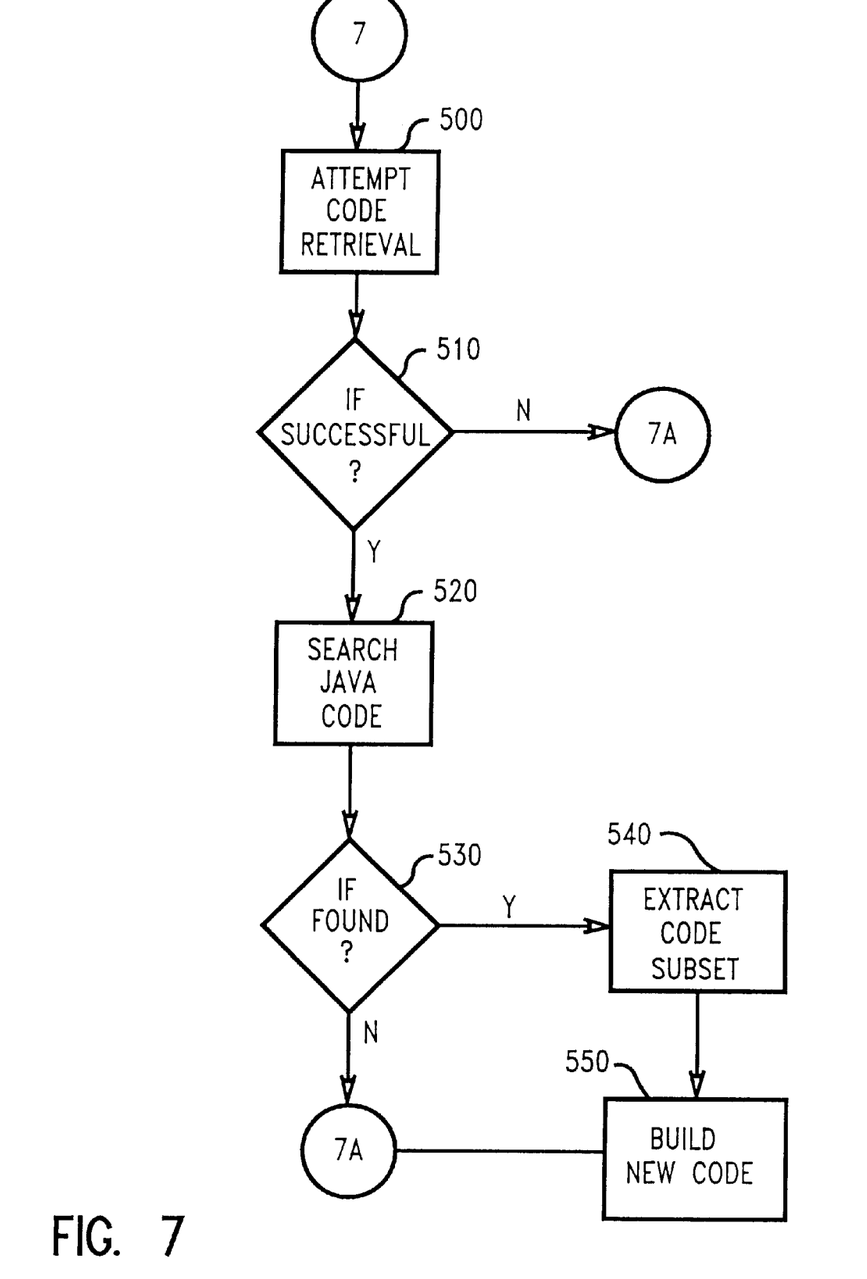

FIG. 7 describes the steps taken if the located code is Java source code, and the flow chart description is as follows:

500—Attempt code retrieval. Java source code may not be available to the client. This is because sometimes it is considered propriety code and only the compiled code is passed to the client. This step in the process is used to attempt to retrieve the Java source code.

510—If successful? Check if there was a successful retrieval of the Java source code.

520—Search java code. Search the java source code for the code that is used to satisfy the search items.

530—If found? Check if the code is found that is used to satisfy the search items.

540—Extract code subset.

550—Build new Java source code that will satisfy the search items for the web page subset.

Figure 8:
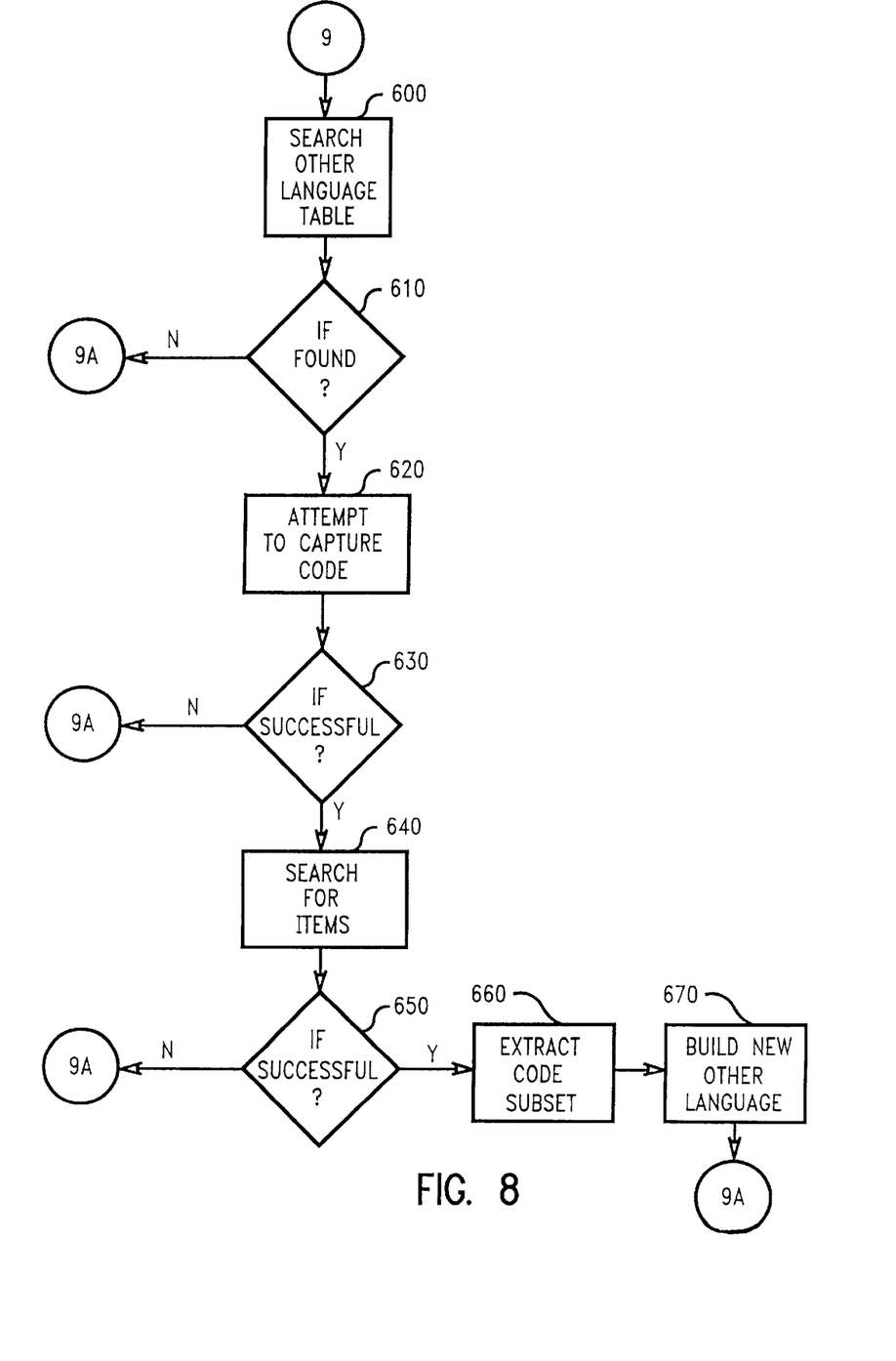

FIG. 8 describes the steps taken if the located code is another language, and the flow chart description is as follows:

600—Search other language table. Search the other language table to see if there is a description of the other language. The description is used to identify the other code and contains instructions for later building the other language subset.

610—If found? Check if the other language description was found in the other language table.

620—Attempt to capture the code. Attempt source code retrieval. Other language source code may not be available to the client. This is because sometimes it is considered propriety code and only the compiled code is passed to the client. This step in the process is used to attempt to retrieve the other language source code.

630—If successful? Check if there was a successful retrieval of the other language source code.

640—Search for items. Search for the items that were requested in the Boolean search.

650—If successful? Check if the search was successful.

660—Extract code subset. Extract the subset of the other language code that is used to satisfy the search items.

670—Build new other language. Build a new other language source code subset that will be used to display the selected search items for the web page subset.

Figure 9:
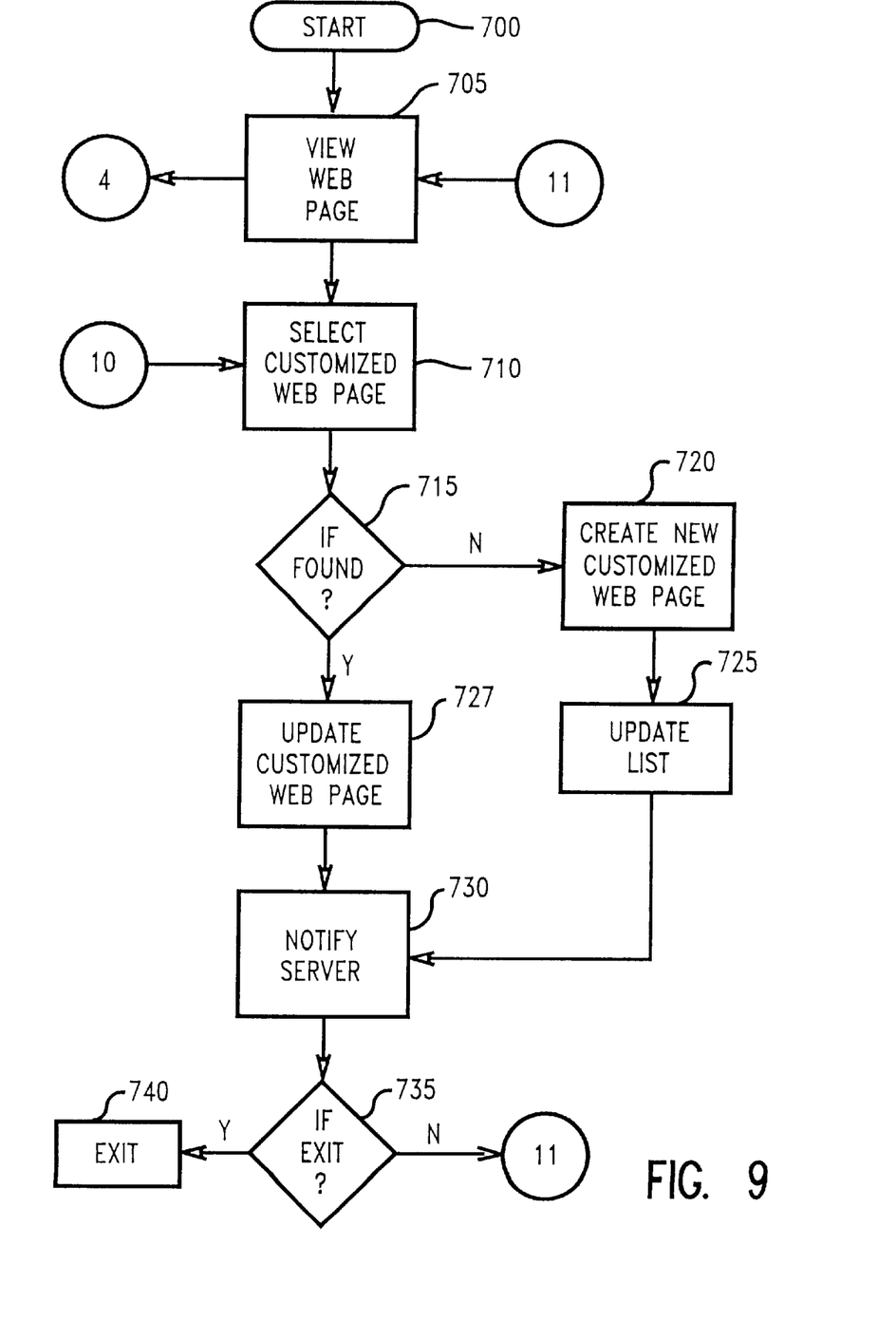

FIG. 9 describes the construction of a customized web page from multiple sources, and the flow chart description is as follows:

700—Start. Start the customized web page from multiple sources process.

705—View the page. View the web page from which data will be extracted for the customized web page.

710—Select customized web page. Select the customized web page, to which information will be added, from a table of customized web pages.

715—If found? Check if the customized web page exists.

720—Create new customized web page. Create the new customized web page from the basic web page of the web page where the web page subset originated and the web page subset.

725—Update list. Update the list of customized web pages with the newly created customized web page location which will be on local storage.

727—Update customized web page. Update the customized web page with the web page subset.

730—Notify server. Notify the server that is the source of the URL that an item is being placed on a customized web page and that the client wishes to be notified when changes are made to the URLs that have come from various web pages. Indicate whether a direct update is desired. The server then updates the server customized table where it keeps track of the customized table where it keeps track of the customized web pages, items and addresses of the client.

735—If exit? Check if time to exit.

740—Exit. Exit the process.

Figure 10:
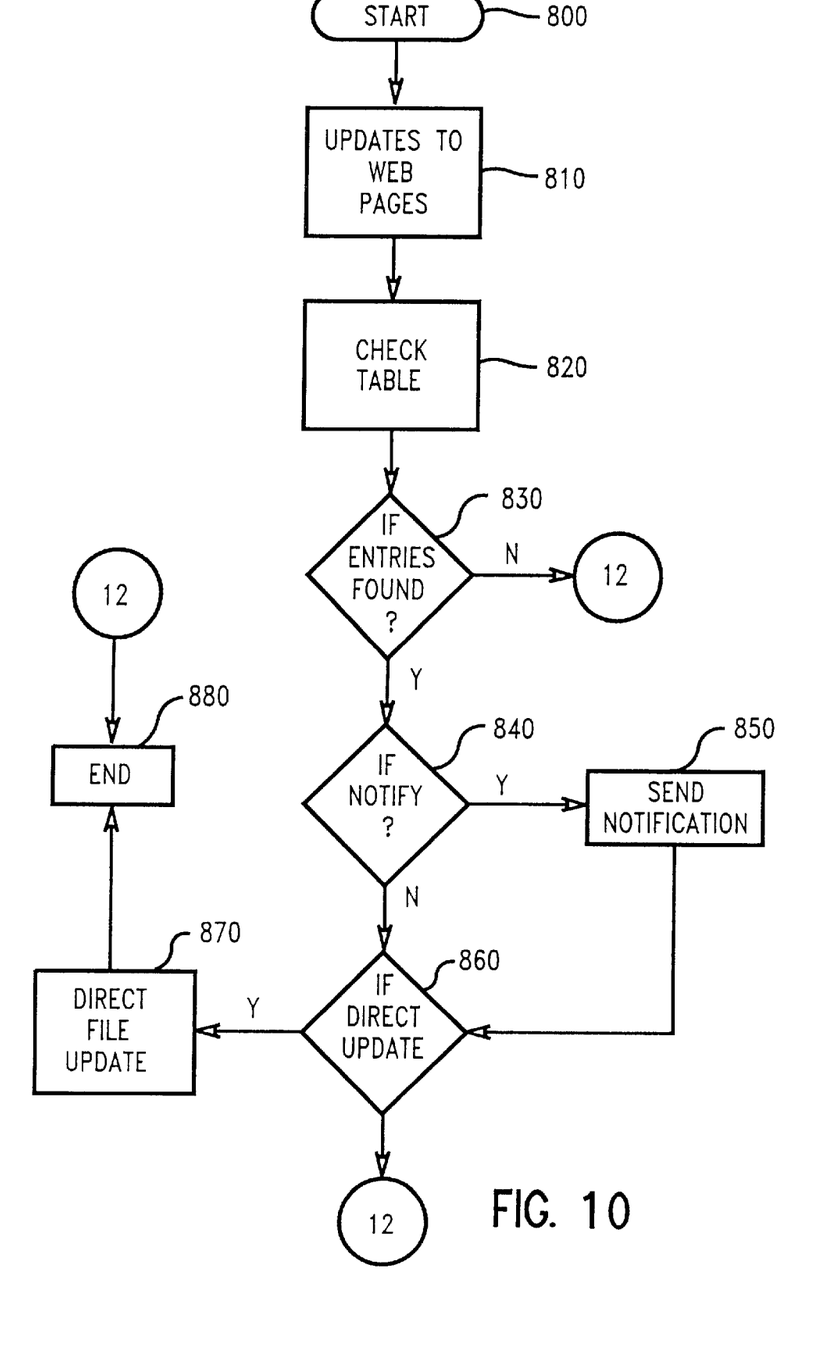

FIG. 10 describes the process at the server, and the flow chart description is as follows:

800—Start. Start the server process.

810—Updates to web pages. The server updates web pages with new URLs.

820—Check table. The server checks the server customized table to see if the URLs added to the web pages have been listed as being in customized web pages.

830—If entries found? Check if there are entries in the server customized table that indicate that the updated URLs are found in customized web pages.

840—If notify? Check if the owners of the customized web pages indicated that they wish to be notified.

850—Send notification. Send the notification to the clients of the customized web pages.

860—If direct update? Check if a direct update of the client customized page is indicated.

870—Direct file update. The server directly updates the web page on the client.

880—End. End the process.

Accordingly, the present invention provides an efficient process and system for creating a customized web page from other web pages accessible by a client computer from an inter- or intra-net. The customized web page may present to a user only a subset of data from a web page that a user desires, while still retaining the original structure of the web pages from the original documents, such as the header, footer and optionally other original structure from at least one of the web pages from the original documents. The customized web page may be constructed from a series of unrelated web pages, it may be updated with changes as the changes take place in the original unrelated web pages.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for creating a customized web page containing information from other web pages accessible by a client computer from an inter- or intra-net comprising the steps of:
   a) providing parameters for a search of desired information from web pages on a network;
   b) initiating a search from a client computer for said desired information on said network;
   c) retrieving said desired information from said search including primary information visible on a web page and imbedded source code from the web page selected from the group consisting of Java code and javascript code;
   d) viewing on said client computer the desired information retrieved from said search on said network;
   e) viewing on said client computer at least one original web page on said network from which the desired information was retrieved in said search;
   f) creating a customized web page on a program storage device accessible by said client computer, said customized web page containing: 1) the desired primary visible information retrieved in said search and 2) the imbedded source code information retrieved in said search selected from the group consisting of Java code and javascript code, of at least one original web page; and
   g) updating said information retrieved in said search on said customized web page when a change in the retrieved information is made in the original web page.

2. The process of claim 1 further including, between steps (e) and (f), the step of modifying said search and repeating steps (b) through (e).

3. The process of claim 1 wherein in step (f) the customized web page contains said desired information retrieved in said search and said other structure in source code selected from the group consisting of HTML, Java and javascript.

4. The process of claim 1 wherein in said steps (c) and (f) the imbedded source code comprises Java code.

5. The process of claim 1 wherein in said steps (c) and (f) the imbedded source code comprises javascript code.

6. A system for creating a customized web page containing information from other web pages accessible by a client computer from an inter- or intra-net comprising:
   means for initiating a search from a client computer of desired information from web pages on a network and retrieving said desired information from said search, said desired information including primary information visible on a web page and imbedded source code from the web page selected from the group consisting of Java code and javascript code;
   means for viewing on said client computer the desired information retrieved from said search on said network and at least one original web page on said network from which the desired information was retrieved in said search; and
   means for creating a customized web page containing: 1) the desired primary visible information retrieved in said search and 2) the imbedded source code information retrieved in said search selected from the group consisting of Java code and javascript code, of at least one original web page.

7. The system of claim 6 further including means for updating said information retrieved in said search on said customized web page when a change in the retrieved information is made in the original web page.

8. The system of claim 6 wherein the imbedded source code comprises Java code.

9. The system of claim 6 wherein the imbedded source code comprises javascript code.

10. A process for creating a customized web page containing information from other web pages accessible by a client computer from an inter- or intra-net comprising:
   a) providing parameters for a search of desired information from web pages on a network;
   b) initiating a search from a client computer for said desired information on said network;

c) retrieving said desired information from said search from at least one original web page on said network accessed through a network server;

d) viewing on said client computer the desired information retrieved from said search on said network;

e) viewing on said client computer the at least one original web page on said network from which the desired information was retrieved in said search;

f) creating a customized web page containing: 1) the desired information retrieved in said search and 2) other structure, not retrieved in said search, of at least one original web page;

g) providing in a program storage device of said network server a database listing of said original web pages containing information retrieved in said search and, for each such original web page in said database listing, a corresponding listing of customized web pages containing said information retrieved in said search from said original web page;

h) determining at said network server if a change has been made to said information retrieved in said search in an original web page; and i) updating said information retrieved in said search on said customized web page when a change in the retrieved information is made in the original web page.

11. The process of claim 10 including, prior to step (iii), the step of sending a notification from said client computer to said network server that said customized web page should be updated when a change in the retrieved information is made in the original web page.

12. The process of claim 10 wherein said step (f) comprises creating a customized web page including: 1) the desired information retrieved in said search comprising primary information visible on a web page and 2) imbedded source code from the web page selected from the group consisting of Java code and javascript code.

13. A process for creating a customized web page containing information from other web pages accessible by a client computer from an inter- or intra-net comprising:

a) providing parameters for a search of desired information from web pages on a network;

b) initiating a search from a client computer for said desired information on said network;

c) retrieving said desired information from said search from at least one original web page on said network accessed through a network server;

d) viewing on said client computer the desired information retrieved from said search on said network;

e) viewing on said client computer the at least one original web page on said network from which the desired information was retrieved in said search;

f) creating a customized web page on a program storage device accessible by said client computer, said customized web page containing: 1) the desired information retrieved in said search and 2) other structure, not retrieved in said search, of at least one original web page, said other structure being selected from the group consisting of headings, footings, imbedded javascript code, text other than said desired information, and any links to other web pages therein;

g) updating said information retrieved in said search on said customized web page when a change in the retrieved information is made in the original web page;

h) providing in a program storage device of said network server a database listing of said original web pages containing information retrieved in said search and, for each such original web page in said database listing, a corresponding listing of customized web pages containing said information retrieved in said search from said original web page;

i) determining at said network server if a change has been made to said information retrieved in said search in an original web page; and j) updating said information retrieved in said search on said customized web page when a change in the retrieved information is made in the original web page.

14. The process of claim 13 including, prior to step (iii), the step of sending a notification from said client computer to said network server that said customized web page should be updated when a change in the retrieved information is made in the original web page.

15. The process of claim 13 wherein said desired information is retrieved from a plurality of original web pages and wherein said step (f) comprises creating a customized web page including: 1) the desired information retrieved in said search from said plurality of original web pages comprising primary information visible on the web pages and 2) imbedded source code from the web pages selected from the group consisting of Java code and javascript code.

16. A system for creating a customized web page containing information from other web pages accessible by a client computer from an inter- or intra-net comprising:

means for initiating a search from a client computer of desired information from web pages on a network and retrieving said desired information from said search from at least one original web page accessed through a network server;

means for viewing on said client computer the desired information retrieved from said search on said network and at least one original web page on said network from which the desired information was retrieved in said search;

means for creating a customized web page containing: 1) the desired information retrieved in said search and 2) other structure, not retrieved in said search, of at least one original web page;

a program storage device accessible by said network server having a database listing of said original web pages containing information retrieved in said search and, for each such original web page in said database listing, a corresponding listing of client computer customized web pages containing said information retrieved in said search from said original web page;

means for determining at said network server if a change has been made to said information retrieved in said search in an original web page; and means for updating said information retrieved in said search on said customized web page when a change in the retrieved information is made in the original web page.

17. The system of claim 16 including means for sending a notification from said client computer to said network server that said client computer customized web page should be updated when a change in the retrieved information is made in the original web page.

18. The system of claim 16 wherein said other structure comprises the imbedded source code selected from the group consisting of Java code and javascript code.

* * * * *

UNITED STATES PATENT AND TRADEMARK OFFICE
CERTIFICATE OF CORRECTION

PATENT NO.   : 6,209,007 B1
DATED        : March 27, 2001
INVENTOR(S)  : Kelley et al.

It is certified that error appears in the above-identified patent and that said Letters Patent is hereby corrected as shown below:

<u>Column 10,</u>
Line 46, delete "and"
Line 52, delete "." and insert therefore --;
means for providing in a program storage device of said network server a database listing of said original web pages containing information retrieved in said search and, for each such original web page in said database listing, a corresponding listing of customized web pages containing said information retrieved in said search from said original web page; and
means for updating said information retrieved in said search on said customized web page when a change in the retrieved information is made in the original web page, thereby effectuating a change in said list of customized web pages. --

<u>Column 12,</u>
Line 13, delete "(iii)", and insert therefore -- (i) --

Signed and Sealed this

Seventh Day of January, 2003

JAMES E. ROGAN
*Director of the United States Patent and Trademark Office*